United States Patent
Pottorff

[11] 3,838,756
[45] Oct. 1, 1974

[54] ACTUATOR MECHANISM FOR CRANE TURNTABLE BRAKE

[75] Inventor: Donald R. Pottorff, Mercersburg, Pa.

[73] Assignee: Walter Kidde & Company, Inc., Clifton, N.J.

[22] Filed: Jan. 8, 1973

[21] Appl. No.: 321,697

[52] U.S. Cl. ............................. 188/170, 188/106 R
[51] Int. Cl. ............................................. F16d 65/14
[58] Field of Search........ 188/170, 106 R, 265, 2 D, 188/2 R, 106 F, 106 P, 204 R; 74/520; 303/13

[56] References Cited
UNITED STATES PATENTS

| | | | |
|---|---|---|---|
| 2,030,753 | 2/1936 | McDonnell | 188/106 R |
| 2,464,097 | 3/1949 | Orscheln | 74/520 |
| 2,588,027 | 3/1952 | McCarthy | 74/520 |
| 2,792,083 | 5/1957 | Bourque et al. | 188/106 R |
| 3,664,453 | 5/1972 | Cottrell et al. | 188/106 R |

*Primary Examiner*—Duane A. Reger
*Assistant Examiner*—Charles E. Frankfort
*Attorney, Agent, or Firm*—Brady, O'Boyle & Gates

[57] ABSTRACT

A mechanical brake actuator includes a manual lever which is self-locking in the active braking position. In such position, the lever and associated cable means applies tension to a spring whose force is applied to the plunger of a hydraulic master cylinder included in the conventional turntable hydraulic brake system. In the event of minor leakage and/or thermal changes in the hydraulic braking system, the spring force exerted by the mechanical actuator maintains safe braking pressure when the crane is parked. When the mechanical actuator is in a release mode, the turntable hydraulic brake is foot pedal operated from the crane operator's cab without interference from the mechanical actuator.

6 Claims, 9 Drawing Figures

PATENTED OCT 1 1974     3,838,756

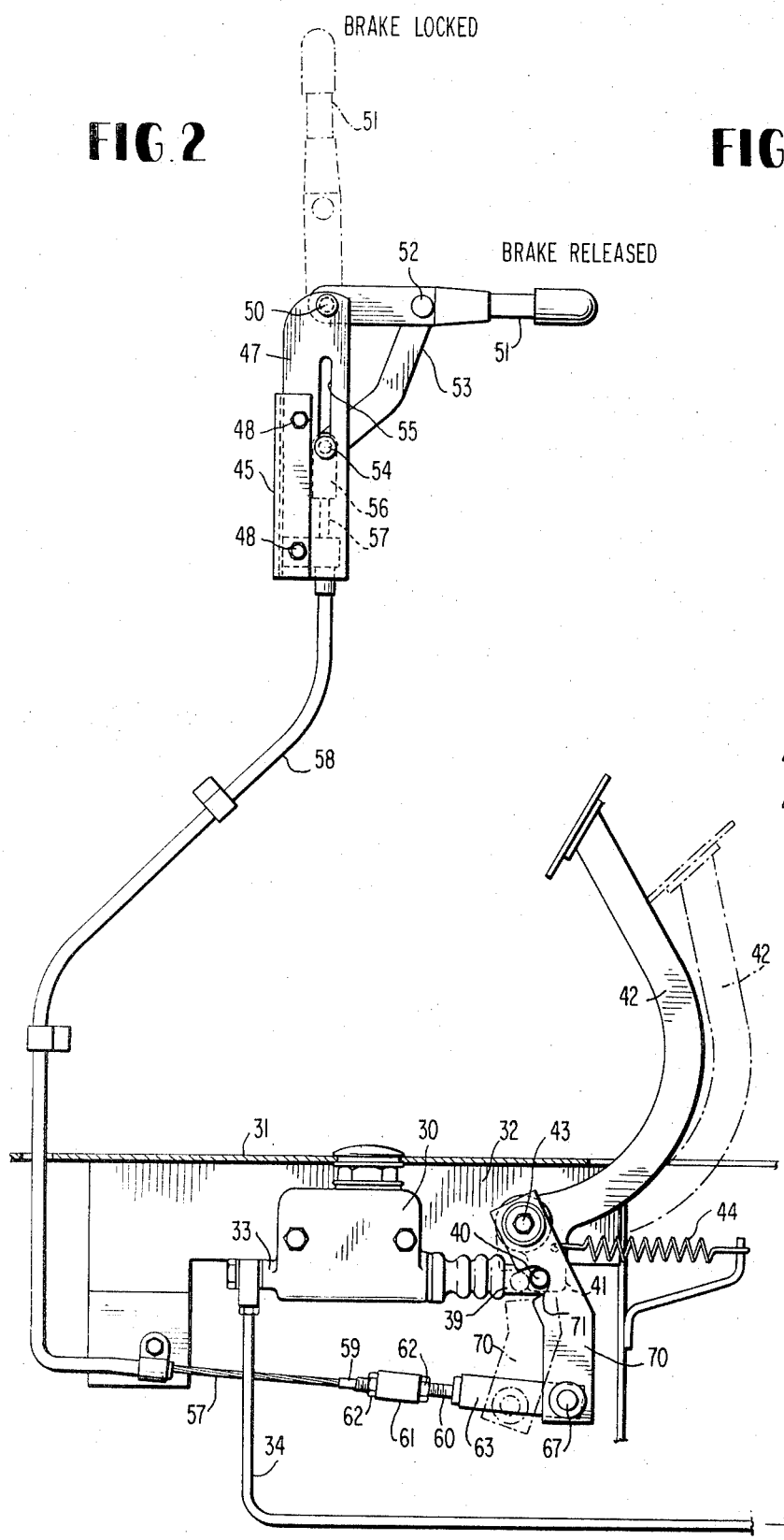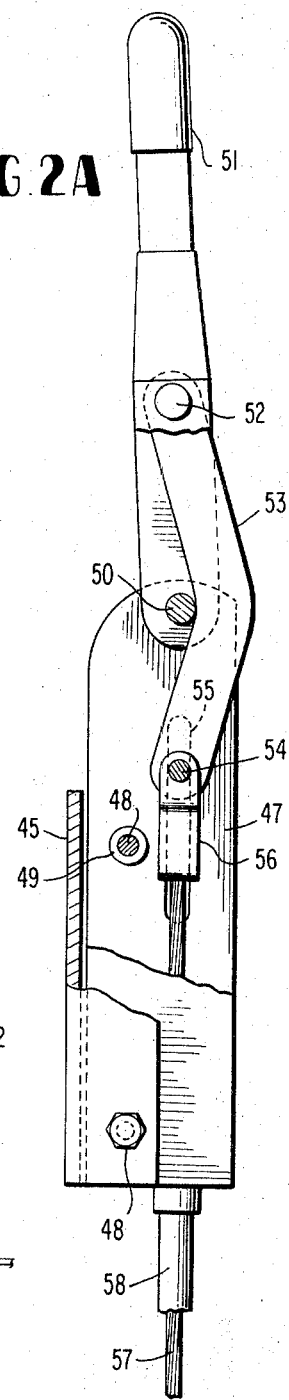

TO SWING BRAKE ASSEMBLY

ACTUATOR MECHANISM FOR CRANE TURNTABLE BRAKE

BACKGROUND OF THE INVENTION

Certain types of mobile construction cranes are hydraulically operated and are equipped with hydraulic turntable driving and braking means. The braking means may consist of a caliper disc brake remotely operated from a conventional foot pedal actuated master cylinder on the crane operator's cab. The customary hydraulic brake system embodies a shut-off valve in the brake pressure line to trap fluid and maintain braking pressure when the crane is parked or during other periods of non-use. The conventional system is subject to loss of brake pressure due to slight leakage of fluid from the system and/or thermal changes, sometimes causing a hazardous situation. The present invention was devised to completely overcome this problem through the provision of a mechanical brake actuator employed in conjunction with the usual foot pedal operated master cylinder means and embodying mechanism which assures the maintenance of adequate pressure in the turntable braking system even where some leakage occurs in the system and/or thermal expansion or contraction effects the system.

In accordance with the invention, a self-locking toggle lever is utilized in conjunction with a push-pull cable to activate the brake master cylinder and apply fluid braking pressure to the system during periods of parking or the like. The mechanical actuator constituting the invention while in the active or brake applying position transmits pressure to the master cylinder plunger through an energized spring device which assures that proper braking pressure equal to that created by the normal operation of the foot pedal will be maintained despite leakage and other conditions which effect the hydraulic system during periods of parking or non-use. When the mechanical actuator is released, it becomes automatically disengaged from the master cylinder plunger so that the usual foot pedal actuator in the crane operator's cab may be employed to brake the turntable without interference by the mechanical actuator.

Consequently, a substantial safety feature is added to the crane through the provision of a very simple and economical mechanical actuator mechanism which is entirely compatible with the existing hydraulic brake system and requires virtually no change in the existing equipment when added thereto. The invention may readily be incorporated in the turntable braking system at the time of manufacturing, or may be provided as an attachment kit for existing cranes in the field with a minimum of expense. The mechanical brake actuator is readily adjustable and is of rugged and durable construction.

Other features and advantages of the invention will become apparent during the course of the following detailed description.

BRIEF DESCRIPTION OF DRAWING FIGURES

FIG. 2 is an enlarged fragmentary side elevation, partly in section, showing the mechanical brake actuator in relation to the conventional foot pedal operated master cylinder and associated parts;

FIG. 2A is a further enlarged fragmentary side elevation, partly in section, showing the self-locking brake lever in the active brake-applying position;

DETAILED DESCRIPTION

Figure 1:
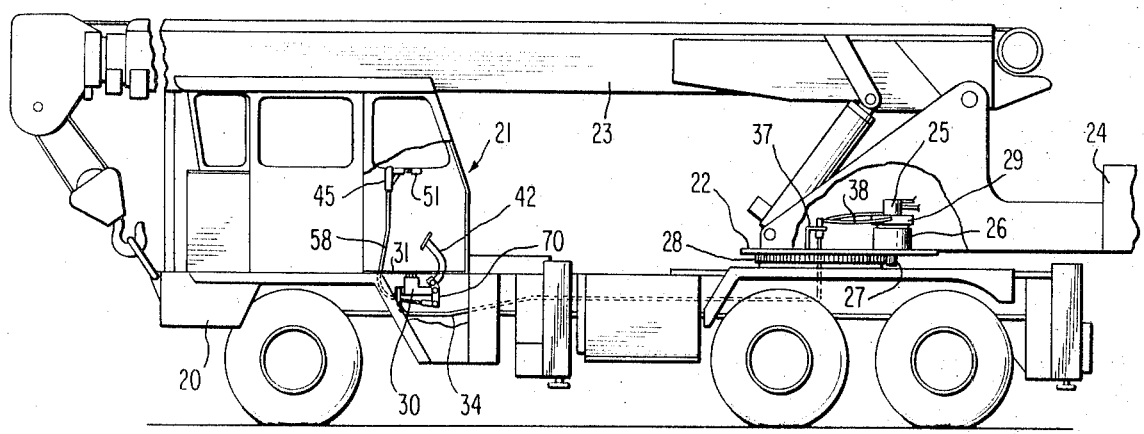
FIG. 1 is a side elevation of a mobile crane equipped with the invention.

Referring to the drawings in detail wherein like numerals designate like parts throughout the several views, attention is directed first to FIG. 1 showing a mobile hydraulically operated crane comprising a wheeled carrier 20 having a tandem type driver and crane operator cab 21 and a turntable 22 mounted upon the carrier 20 for rotation around a vertical axis. The turntable 22 mounts the usual telescopic crane boom 23 and counterweight means 24 and associated parts.

In the type of crane illustrated herein, the turntable may be driven a full 360° in either direction by the operation of a hydraulic motor 25 having conventional controls and being coupled through a gear speed reducer 26 with a drive pinion 27 in mesh with a large turntable ring gear 28. A conventional caliper-type disc brake mechanism 29 is provided between the hydraulic motor 25 and reducer 26 to apply braking force to the turntable when such force is required.

Figure 3:
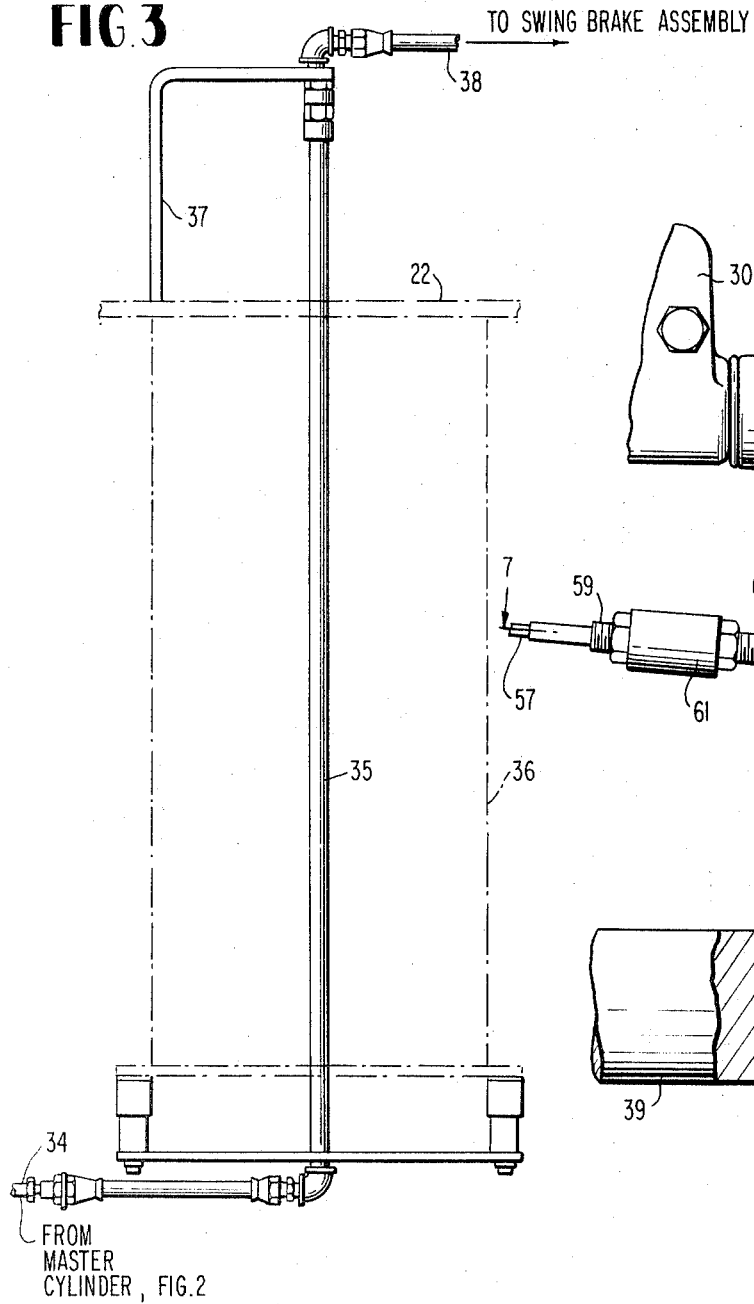
FIG. 3 is a fragmentary side elevational view showing a vertical branch of the hydraulic brake line where the same is routed through the crane turntable swivel.

A hydraulic brake master cylinder 30 mounted beneath the floor panel 31 of the crane operator's cab on a fixed bracket means 32 has an output port 33 connected to a hydraulic line 34. This line 34 extends rearwardly from the cab 21 toward the turntable 22 and includes a vertical branch 35, FIG. 3, routed through the swivel 36 for the turntable. The upper end of the vertical branch line 35 may be stabilized by a bracket 37 on the turntable 22 and an additional branch line 38 at the top of the vertical branch 35 leads to the hydraulically operated conventional disc brake mechanism 29 and is conventionally connected therewith.

The hydraulic master cylinder 30 has the usual reciprocating plunger 39 pivotally connected by a cross pin 40 to a short depending crank lug 41 on a brake operating foot pedal 42 which projects above the cab floor panel 31. The foot pedal 42 is conventionally and securely pivoted at 43 to the sturdy bracket 32 which also supports the master cylinder 30 below the floor panel 31. The foot pedal 42 is equipped with the usual return spring 44, as shown.

The construction thus far described is existing conventional equipment on the form of mobile crane depicted in FIG. 1 and therefore need not be described in further detail. This conventional turntable hydraulic brake system has a shut-off valve, not shown, at a convenient point in the line to trap the hydraulic fluid in order to maintain braking pressure sufficient to activate the disc brake 29 when the crane is parked or idle. As stated previously, slight leakage in the system or thermal contraction sometimes will deactivate the brake 29 while the crane is parked giving rise to a hazardous condition, and as explained previously the principal objective of the invention is to eliminate such a condition.

Referring now to the other figures of the drawings which show the details of the mechanical actuator for the turntable brake forming the subject matter of the invention, the numeral 45 designates a brake lever mounting bracket which is fixedly secured to an adjacent side wall 46 of the cab 21. A pair of spaced vertical support plates 47 are securely bolted to one flange of the mounting bracket 45 by bolt means 48 carrying spacers 49, FIG. 2A, which maintain the plates 47 separated and parallel. Pivotally attached to the tops of the support plates 47 by a suitable pivot pin 50 is a vertically swingable brake actuating lever 51. As shown in FIG. 1, the lever 51 is disposed at a convenient elevation in the operator's cab 21 above and near the existing foot pedal 42.

Between its ends, the lever 51 is pivotally connected as at 52 to one end of an elbow toggle link 53 having its other end pivotally attached to a pin element 54 which rides in vertical guide slots 55 of the two support plates 47. The pin 54 is pivotally coupled to a clevis 56 attached to one end of a flexible cable 57 which extends through a suitably anchored guide sheathing 58 in the cab 21 and below the floor panel 31, as shown. The guide sheathing 58 may be conveniently clipped to the cab side wall 46 and to the bracket structure 32 as indicated. The remote end of the cable 57, after emerging from the sheathing 58, FIG. 2, extends rearwardly beneath the master cylinder 30 and foot pedal 42, as shown.

Figure 7:
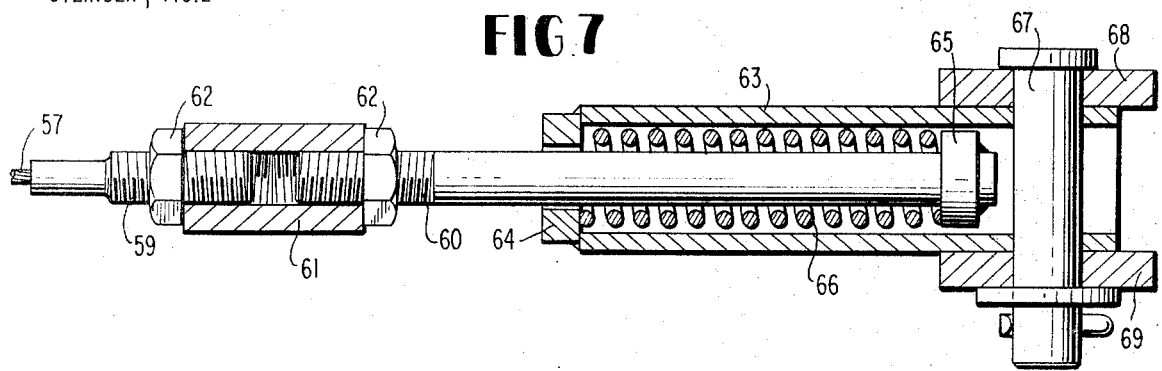
FIG. 7 is a similar section taken on line 7—7 of FIG. 5.

This last-mentioned end of the cable 57 remote from the lever 51 is secured firmly to a screw-threaded coupling element 59 which is adjustably coupled to a screw-threaded rod 60 through a threaded coupling sleeve 61 equipped with locking nuts 62. The rod 60, FIG. 7, projects longitudinally into a sleeve 63 having a guide washer 64 for the rod welded to one end thereof. The rod 60 has an enlarged head 65 within the sleeve 63 and is surrounded by a compressible coil spring 66 whose opposite ends bear against the opposed faces of the washer 64 and head 65. Beyond the head 65 and near one end of the sleeve 63, the latter is pivotally mounted on a cross pin 67, by means of which the sleeve is pivoted between the bifurcated lower ends 68 and 69 of a crank arm 70 having its upper end pivotally attached to the bolt means 43 which supports the customary foot pedal 42. Thus, the foot pedal 42 and crank arm 70 are coaxially pivotally mounted independently. The crank arm 70 is an angled or elbow arm, as shown in the drawings.

Intermediate its ends and somewhat closer to its upper end, the crank arm 70 has a deep round end notch 71 formed in its side facing the master cylinder 30. The crank arm 70 is off-set slightly from one side of the master cylinder plunger 39, and the cross pin 40 of this plunger 39 has a roller extension 72 on one end thereof adapted to enter the notch 71 whenever the crank arm 70 is pulled forwardly by the cable 57 to a turntable brake applying position. When the roller extension 72 bottoms in the notch 71, continued movement of the crank arm 70 will force the master cylinder plunger 39 inwardly to activate the turntable brake 29.

Figure 4A:
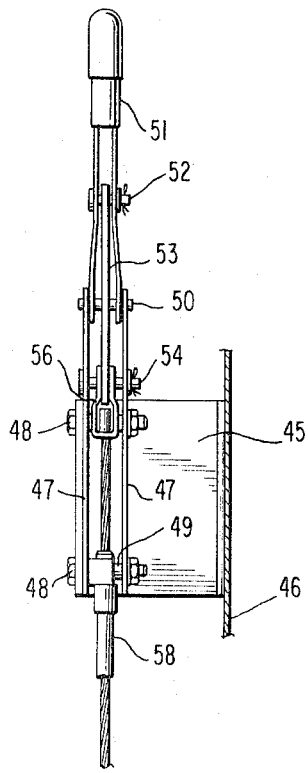
FIG. 4A is another fragmentary elevational view similar to FIG. 4 and showing the actuator lever in the locked position.
Figure 4:
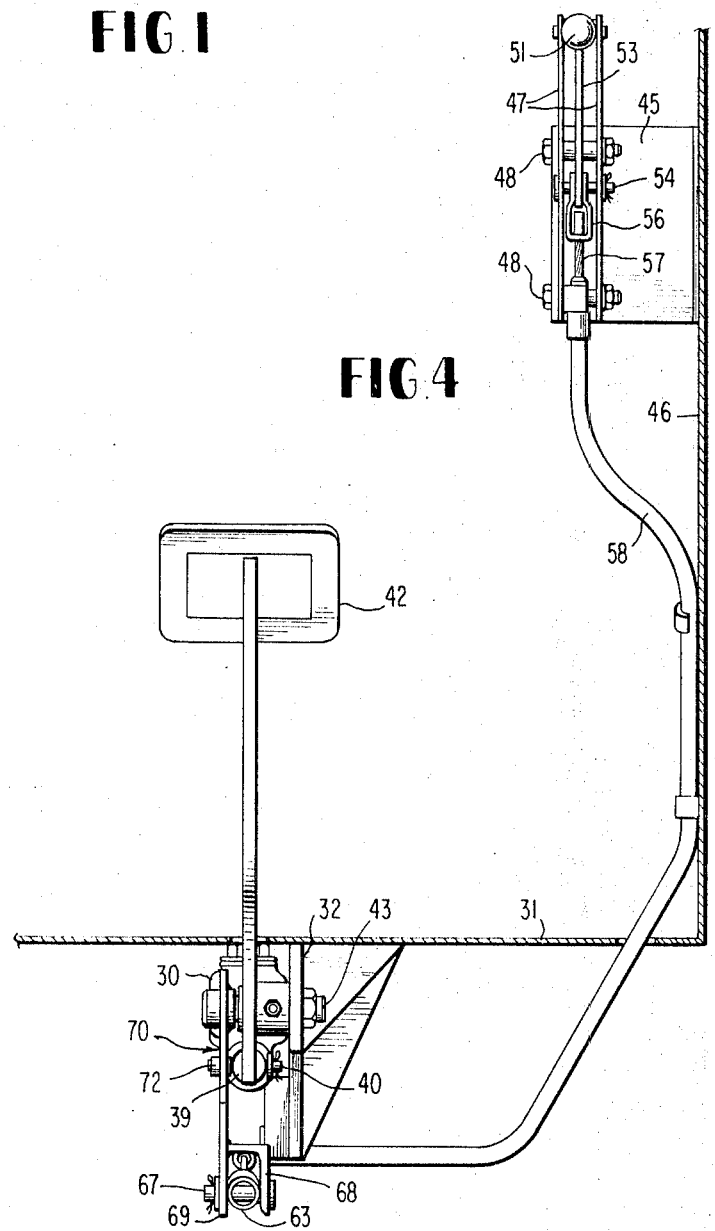
FIG. 4 is a fragmentary elevational view of the mechanical actuator means and associated parts taken at right angles to FIG. 2 and being partly in section.

The manual brake actuating lever 51 is self-locking when shifted to the upright active position shown in FIGS. 2A and 4A. When in this position, the lever travels approximately 3° beyond a dead center position with respect to the location of the pivots 52 and 50 and the tension force exerted by the cable 57 on the toggle link 53 will maintain the lever securely locked in the brake-applying position, the pin 50 serving as a stop against the link 53. At this time, the pin 54 is pulled by the link 53 upwardly in the guide slots 55 and the cable 57 is pulled and tensioned to cause substantial compression of the spring 66 when the crank arm is moved by the cable into positive engagement with the roller extension 72 of the master cylinder plunger 39. Thus, the movement of the lever 51 to the upright active position will apply or activate the turntable brake 29 and the stored energy in the spring 66 will continue to exert pressure on the master cylinder plunger equal to the normal operating pressure induced by use of the foot pedal 42 as long as the lever 51 remains in the brake activating position. Consequently, if any slight leakage occurs in the hydraulic brake system or if thermal changes take place, the spring will compensate for this and will maintain adequate braking pressure in the system while the crane is idle or parked. This constitutes a significant improvement and safety feature over the prior art.

Figure 5:
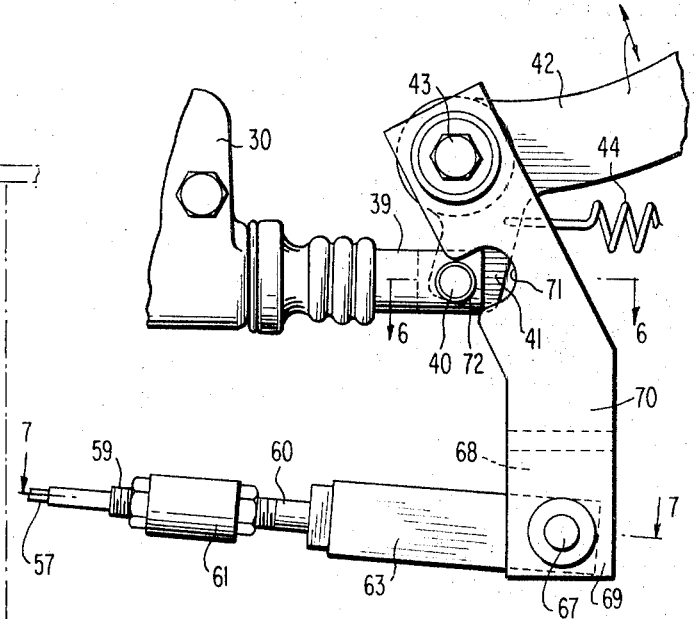
FIG. 5 is an enlarged fragmentary side elevation of the mechanical brake actuator in the released position relative to the master cylinder plunger and conventional foot pedal operator.
Figure 6:
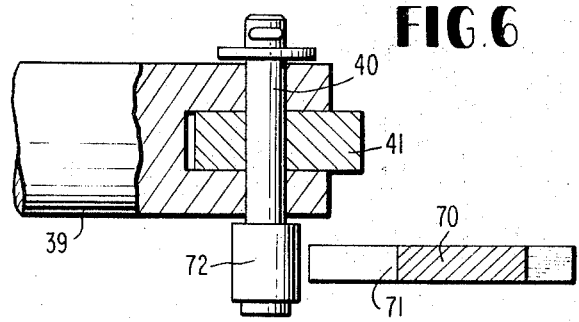
FIG. 6 is an enlarged fragmentary section taken on line 6—6 of FIG. 5.

To release the mechanical brake actuator, the operator merely pushes the lever 51 forwardly and downwardly to pass the dead center condition and this will release the force of spring 66 to shift the rod 60 and cable 57 with the crank arm 70 to the inactive position shown in full lines in FIG. 2 and also shown in FIG. 5. In such position, the pin 40 of plunger 39 is clear of the notch 71 and the turntable brake 29 may be operated in the usual manner by the foot pedal 42 without interference from any part of the mechanical actuator system.

It is thought that the invention is substantially foolproof and achieves its full objective of maintaining adequate braking pressure in the hydraulic brake system at all times due to its ability to compensate for leakage, etc. The mechanism is simple and very easy to install and adjust and requires minimum maintenance.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A safety brake actuator mechanism for a construction crane turntable hydraulic brake, said turntable hydraulic brake including a brake master cylinder having a plunger and a foot pedal operator for said plunger connected thereto, the improvement comprising a crank arm disposed near said master cylinder plunger, a pivot element common to said foot pedal operator and said crank arm and pivotally supporting both independently, said crank arm being operatively connected with said plunger independently of the connection of the foot pedal operator with said plunger, a manual safety operating lever for said turntable hydraulic brake having brake activating and release positions, a linkage connected with said manual lever and operable to lock the lever releasably in said brake activating position when the lever is moved to such position, a cable connected with said linkage and extending near to said crank arm, and a connector means attached to said cable near said crank arm and being pivotally secured to the crank arm, whereby movement of the cable responsive to movement of said lever to the brake activating position will swing the crank arm and cause the latter to move the plunger in a direction to activate the turntable hydraulic brake, said connector means including a pair of relatively movable parts and a spring interconnecting said parts, said spring being tensioned and storing energy to exert pressure through said crank arm on said plunger when said lever is in the brake activating position, said spring automatically returning said crank arm to a turntable brake release position relative to said plunger when said lever is moved to said brake release position.

2. The structure of claim 1, and said pair of relatively movable parts comprising a rod member attached to said cable and having a head, a guide sleeve for the rod member telescopically receiving it and being pivotally secured to the crank arm, a compression spring within the sleeve surrounding the rod member and having one end engaging said head of the rod member and another end engaging a part of said sleeve.

3. The structure of claim 2, and a cable length adjustment connection in said rod member.

4. The structure of claim 2, and said guide sleeve being pivotally secured to said crank arm by a pin element which extends diametrically through said sleeve directly in the path of movement of the rod member so that the latter in response to expansion of said spring will engage the pin element and move the crank arm to its brake release position.

5. The structure of claim 1, and said crank arm being spaced laterally from said foot pedal operator on said common pivot element and having a notch in its leading edge, and a lateral pin element on said master cylinder plunger engageable within said notch when said crank arm is moved by said cable and said connector means to said brake activating position, reverse movement of said crank arm under influence of said spring separating said pin from said notch, whereby said foot pedal operator may move said master cylinder plunger independently of said crank arm and without interference from the latter.

6. The structure of claim 1, and said linkage comprising a fixed support member for said manual safety operating lever, a pivot element for said lever on said support member, a toggle link pivotally attached to said lever and being connected to said cable, and a linear guide for said toggle link on said fixed support member, said lever and toggle link assuming a beyond dead center locked position on said support member when said lever is moved to said brake activating position.

* * * * *